No. 796,675. PATENTED AUG. 8, 1905.
M. C. RYPINSKI & L. T. ROBINSON.
RECORDING INSTRUMENT.
APPLICATION FILED MAR. 30, 1903.
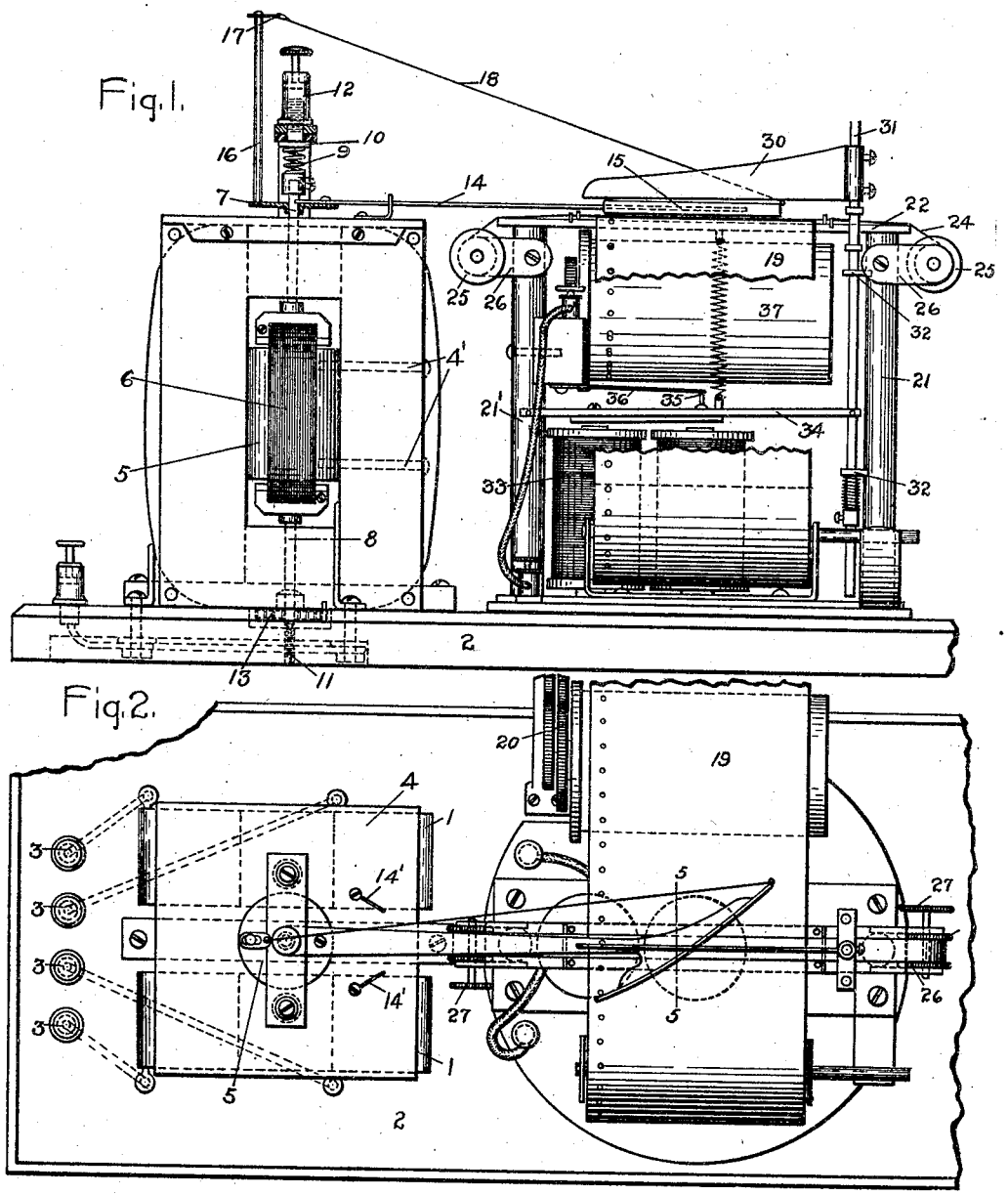
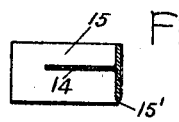
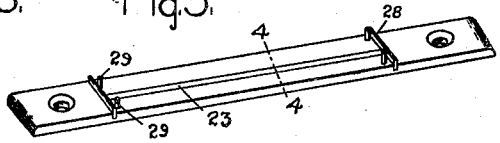
WITNESSES:
INVENTORS:
Lewis T. Robinson;
Maurice C. Rypinski;
by Albert G. Davis
Atty.

UNITED STATES PATENT OFFICE.

MAURICE C. RYPINSKI, OF NEW YORK, AND LEWIS T. ROBINSON, OF SCHENECTADY, NEW YORK, ASSIGNORS TO GENERAL ELECTRIC COMPANY, A CORPORATION OF NEW YORK.

RECORDING INSTRUMENT.

No. 796,675.          Specification of Letters Patent.          Patented Aug. 8, 1905.

Application filed March 30, 1903. Serial No. 150,134.

*To all whom it may concern:*

Be it known that we, MAURICE C. RYPINSKI, residing at New York, county of New York, and LEWIS T. ROBINSON, residing at Schenectady, county of Schenectady, State of New York, citizens of the United States, have invented certain new and useful Improvements in Recording Instruments, of which the following is a specification.

Our invention relates to instruments of that character in which a movable marking element makes a record upon a surface.

When the movable element is pivoted and oscillates in a plane to make a record upon a surface which moves parallel to the plane of oscillation with a speed corresponding to some function of time, the record will not in general be truly indicative of the time at which it is made, owing to the curvature of the path through which the marking element travels.

The object of our present invention is the provision of means whereby this difficulty can be avoided. One embodiment of the invention which we have made to accomplish this result contemplates the use of two coöperating elements. One of these elements is a straight edge over which the record-surface is moved through the agency of a time mechanism in a direction at right angles to this straight edge. The other element is carried by the movable element of the instrument and consists of a curved marking edge, the record-surface, which is located between the two marking elements, being marked only at the intersection of the two edges. By giving a suitable curve to the movable edge a definite angular movement of the movable instrument element can be caused to produce any desired amount of travel of the point of intersection of the two edges along the length of the straight edge. By this construction we are able, therefore, to translate the angular movement of the instrument element into a straight-line movement. We can also arbitrarily determine the amount of right-line movement produced by a definite angular movement of the marking element.

For a better understanding of our invention reference may be had to the accompanying drawings, in which we have illustrated one embodiment of our invention.

Of the drawings, Figure 1 is an elevation. Fig. 2 is a plan view. Fig. 3 is a perspective view of a detail. Fig. 4 is a cross-section taken on line 4 4 of Fig. 3; and Fig. 5 is a sectional view taken on the line 5 5 of Fig. 2, showing another detail of construction.

The particular instrument which we have illustrated in the drawings is used as a voltmeter.

A pair of vertical coils 1 are mounted upon a base 2. The terminals of these coils are connected to binding-posts 3 and are arranged so that the coils may be connected in series or in parallel. Bolts 4', passing through the framework 4, which supports and partially surrounds the coils 1, hold in position a cylindrical block of magnetic material 5. A movable substantially rectangular coil 6 surrounds the block 5 and has its axis in line with the axis of the block. Trunnions 7 and 8 extend from the coil in line with the axis of the block 5. The upper trunnion 7 is secured to one end of a helical spring 9, the other end of which is secured to and insulated from a yoke 10, mounted on the top of the casing 4. The lower end of the trunnion 8 is journaled in a bearing formed in the upper end of a threaded post 11. A binding-post 12, carried by the yoke 10, is in electrical contact with the spring 9, which in turn is electrically connected with one end of the coil 6. A suitable flexible conductor 13 is secured to the lower end of the trunnion 8, which forms an electrical connection between the other end of the coil and the flexible conductor 13. The binding-post connected to the flexible conductor 13 has not been illustrated in the drawings.

In the particular instrument which we have illustrated the terminals of the coil 6 are connected to some source of constant potential and the coils 1 are in shunt to the lines the potential difference between which it is desired to measure. With such an instrument increases in the current passing through the coils 1 will produce substantially proportional angular movements of the coil 6 through a comparatively large arc of movement. The torque tending to turn the coil 6 on the passage of given currents through the coils 1 and 6 will be determined by the proportions and arrangements of the coils. The movement produced by such a torque will be controlled by the strength of the spring 9, which forms the yielding resistance against which the torque is balanced.

A pointer or arm 14 extends perpendicularly from the trunnion 7 above the casing 4. This arm carries at its outer end a curved vertical marking element 15, having a sharp lower edge 15'. The arm 14 and the marking element 15 may be formed integrally or they may be formed of two pieces of sheet metal soldered together. The arm 14 also carries a post 16, which is located on the opposite side of the trunnion 7 from the marking element. The post 16 extends upward above the binding-post 12 and carries at its upper end an adjustable slotted plate 17. A wire or stay 18 extends from the plate 17 to the outer end of the arm 14 and forms a means for increasing the rigidity of the arm 14. Stops 14' carried on the upper surface of the casing 4 limit the movement of the arm 14.

The marking element 15 travels over a web of paper or similar material 19, which is moved in a plane parallel to the plane of movement of the element 15 and in the construction illustrated substantially perpendicular to the position of the arm 14 when in its intermediate position, as shown in Fig. 2. Any suitable mechanism (conventionally indicated at 20) may be employed to give a certain definite movement to the record-surface per unit of time.

A pair of posts 21 and 21', extending perpendicularly from the base 2, carry at their upper end a bar or support 22. The bar 22 is formed with a rib or sharpened edge 23 on its upper side. The rib 23 forms a straight edge extending perpendicularly to the direction of movement of the web of paper 19. A transfer-ribbon 24 is carried lengthwise across the top of the bar 22 by rolls 25, mounted in brackets 26, carried by the post 21. The ribbon may be fed from one roll to the other by turning knurled handles 27, mounted on the roll-shafts. Guides 28, carried on the upper side of the bar 22, form means for guiding the ribbon 24. Studs 29, also carried by the bar 22, position the record-strip 19.

It will readily be understood that the sharpened lower edge 15' of the marking element 15 will press the record-ribbon against the surface of the paper strip 19 with sufficient force to make a record only at the point of intersection of the marking edge 15' and the straight edge 23. As the coil 6 oscillates about its axis the point of intersection will travel along the straight-edge 23, and by properly proportioning the curved edge 15 a definite angular movement of the coil 6 can be caused to give any desired amount of movement to the point of intersection of the edge 15' with the edge 23. Thus not only can the angular movement of the coil 6 and arm 14 be caused to give a straight-line movement to the recording-point, but an instrument in which variations in the value of the quantity to be measured does not produce proportional angular movements of the arm 14 can be caused to produce proportional movements of the intersection point of the edges 15' and 23 along the edge 23.

It is obvious that the instrument described will operate satisfactorily where the marking edge 15' always rests against the surface of the record-ribbon 24; but in order to avoid the friction which necessarily results from such a construction the arm 14 may in some instances be mounted so as to be normally out of engagement with the record-ribbon. In such cases a hammer 30, extending parallel to the bar 22 and carried by a vertical shaft 31, reciprocating in guides 32, carried by one of the posts 21, is caused to engage the top of the marking element 15 or arm 14 at intervals to cause it to engage the record-ribbon to make an impression upon the record-strip, the arm 14 being sufficiently flexible for this purpose. An electromagnet 33, having its armature pivoted at one end to the post 21' and at the other end to the bar 31, may be employed to reciprocate the bar 31. The armature 34 carries a contact 35, which engages with a contact 36 to close a circuit through the electromagnet 33 when the armature is in its upward position, as shown. When the circuit is closed by the engagement of the contacts 35 and 36, the electromagnet is energized and the armature is drawn downward. This causes the hammer 30 to force the marking element 15 downward and make a record upon the record-sheet. When the armature moves downward, the contacts 35 and 36 separate and the circuit through the electromagnet 33 is broken. The armature is then moved upward by the spring 37, connected at one end to the under side of the member 22 and at the other end to the upper side of the armature. This forms a means for obtaining a very rapid reciprocation of the hammer 30 with the corresponding large number of record-points, while at the same time it allows the marking element 15 to move without frictional engagement with the record-ribbon or record-surface. No claim, however, is made in this application to the particular mechanism employed for reciprocating the hammer 30, as it forms no part of our joint invention.

While the particular instrument which we have illustrated in the drawings has been described as a voltmeter, it will be readily understood that our invention is capable of employment with other measuring instruments than a voltmeter, and while we have illustrated and described the best form of our invention which is now known to us we do not intend to be limited to the exact details of construction herein shown and described, as it is apparent that many changes in construction and arrangement may be made without departing from the spirit of our invention. For instance, instead of applying our invention to an instrument in which the record-surface moves in the manner hereinbefore described it could be readily applied to an instrument in which the record-surface rotates about a center or axis. In this case the straight marking edge should be placed radially with respect to the center of rotation, and the other edge should be mounted to move over, as in the construction heretofore described.

What we claim as new, and desire to secure by Letters Patent of the United States, is—

1. In combination, a rib or straight edge, means for moving a record-surface in a direction perpendicular to said straight edge, a marking element pivoted in a plane parallel to the record-surface, said marking element having a curved marking edge, and means acting to cause an intermittent engagement of the record-surface between the rib and the curved marking edge.

2. In combination, a movable meter element, a curved marking element carried thereby, means for moving a record-surface in proximity to said marking element, and means for causing different portions of the curved marking element to engage the record-surface for different positions of the meter element.

3. In combination, a pair of marking elements crossing one another at an angle and coöperating to engage and mark a record-surface only at their point of intersection.

4. In combination, a pair of marking edges crossing one another at an angle and engaging and marking a record-surface at the point of their intersection.

5. In combination, a pair of relatively movable marking edges crossing one another at an angle and engaging a record-surface at their point of intersection to make a continuous record or mark thereon.

6. In combination, a pair of relatively movable intersecting marking edges which engage a record-surface to make a record at the point of their intersection.

7. In combination, a movable element, the movements of which are responsive but not proportional to changes in the value of a variable quantity, means for giving a record-surface a time movement, a pair of marking elements engaging at a point to make a record upon said record-surface, and means actuated by said movable element for causing the point of engagement of the marking elements to move proportionally to the changes in value of the variable quantity.

8. In combination, an element having an angular movement, the movements of said element being responsive but not proportional to changes in the value of a variable quantity, means for giving a record-surface a time movement, marking means for engaging said record-surface to make a record, and means actuated by the movable element for causing the point of engagement of said marking means to move in a straight line, the movements of said marking means being proportional to the changes in value of the variable quantity.

In witness whereof I have hereunto set my hand this 25th day of March, 1903.

MAURICE C. RYPINSKI.

Witnesses:
 LINZEE BLAGDEN,
 WM. H. LAMMERS.

In witness whereof I have hereunto set my hand this 26th day of March, 1903.

LEWIS T. ROBINSON.

Witnesses:
 BENJAMIN B. HULL,
 HELEN ORFORD.